United States Patent
Drabek

(10) Patent No.: US 7,730,799 B2
(45) Date of Patent: Jun. 8, 2010

(54) GEAR TRANSMISSION MECHANISM WITH A LAYSHAFT

(75) Inventor: Michael Drabek, Brandenburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 170 days.

(21) Appl. No.: 11/708,155

(22) Filed: Feb. 16, 2007

(65) Prior Publication Data

US 2007/0227285 A1    Oct. 4, 2007

(30) Foreign Application Priority Data

Feb. 16, 2006   (DE) .................. 10 2006 007 120

(51) Int. Cl.
*F16H 3/08*   (2006.01)
*F16H 59/00*   (2006.01)

(52) U.S. Cl. ........................... 74/329; 74/335

(58) Field of Classification Search ............. 74/329, 74/330, 331, 335, 340, 325, 606 R
See application file for complete search history.

(56) References Cited

U.S. PATENT DOCUMENTS

| | | | | |
|---|---|---|---|---|
| 1,137,804 A * | 5/1915 | Sperry | ........................ | 192/3.56 |
| 1,169,633 A * | 1/1916 | Gottle et al. | ................. | 74/375 |
| 1,731,338 A * | 10/1929 | Hand | ........................... | 74/375 |
| 3,508,450 A * | 4/1970 | Richards | ..................... | 74/340 |
| 3,589,483 A * | 6/1971 | Smith | ........................ | 192/3.52 |
| 4,860,607 A * | 8/1989 | Numazawa et al. | ........... | 74/330 |
| 4,899,622 A | 2/1990 | Kobayashi | | |
| 6,766,705 B1 * | 7/2004 | Hall, III | ........................ | 74/331 |
| 7,644,638 B2 * | 1/2010 | Taniai | ......................... | 74/335 |
| 2002/0189383 A1 * | 12/2002 | Schamscha | .................. | 74/340 |
| 2003/0051577 A1 * | 3/2003 | Hirt | ............................. | 74/664 |
| 2004/0060378 A1 * | 4/2004 | Yamamoto et al. | ............ | 74/335 |
| 2005/0103140 A1 * | 5/2005 | Gumpoltsberger | ........... | 74/329 |
| 2005/0126321 A1 * | 6/2005 | Ochi et al. | .................... | 74/335 |
| 2005/0193848 A1 * | 9/2005 | Gitt | ............................. | 74/340 |
| 2006/0219050 A1 * | 10/2006 | Morise et al. | ............. | 74/606 R |
| 2007/0199396 A1 * | 8/2007 | Taniai | ......................... | 74/335 |
| 2008/0148900 A1 * | 6/2008 | Buannec et al. | ........... | 74/606 R |
| 2009/0000410 A1 * | 1/2009 | Guggolz et al. | ............... | 74/335 |

FOREIGN PATENT DOCUMENTS

DE        37 17 255 A1     11/1987
DE       197 34 980 A1      2/1999

OTHER PUBLICATIONS

Christiani—Competent in the Field of Motor Vehicles, http://www.kfz-tech.de (web page) © 2006, pp. 3. Copyright für Programme, Texte, Animationen und Bilder: H. Huppertz—Email: harald.huppertz@t-online.de including a 6-page translation of the website.

* cited by examiner

*Primary Examiner*—Roger Pang
(74) *Attorney, Agent, or Firm*—Davis & Bujold, P.L.L.C.

(57) ABSTRACT

A gear transmission mechanism (2) for motor vehicles having a main shaft (10, 12) and a countershaft (14) parallel to one another, on which different gears for different gear ratios are arranged. The countershaft (14) is arranged above a horizontal plane (X-Y axis) containing a main shaft axis (16) with respect to the axle system of the vehicle so that installation space for the functional components (gearshift elements 18, a hydraulic system 20) of the transmission is available below the gearset formed by the gearbox wheels.

12 Claims, 2 Drawing Sheets

GEAR TRANSMISSION MECHANISM WITH A LAYSHAFT

This application claims priority from German Application Ser. No. 10 2006 007 120.4 filed Feb. 16, 2006.

FIELD OF THE INVENTION

The invention concerns a gear transmission mechanism. It should be noted at this point that the term "main shaft" can comprise one individual main shaft or also, for instance, two transmission main shafts co-axial to one another, as shown in an embodiment of the invention.

BACKGROUND OF THE INVENTION

Gear transmission mechanisms with one main shaft and one countershaft parallel to one another have been known for some time and are in use in multiple embodiments, particularly as vehicle gearboxes. Several idly rotatable gears, so-called idler gears, are arranged on the main shaft and permanently engage with assigned rotationally fixed counter gears arranged on the countershaft. The different pairs of idler gears/counter gears correspond to the different gear ratios of the gearbox, as is generally known and therefore not explained here in detail.

The torque initiated in the transmission by the drive motor, via at least one clutch, is transmitted to the countershaft, via a countershaft gear cluster, and from there to the corresponding idler gears, via the torque-proof counter gears, arranged on the countershaft. The torque is transmitted to the main shaft and the output shaft, respectively, by coupling one of the idler gears via an assigned clutch, which subsequently actuates the drive wheels, via a differential gear.

With known gear transmission mechanisms, the countershaft is basically positioned below the main shaft with respect to the axle system of the vehicle, so that this transmission features a relatively large overall installed size below the main shaft that is generally co-axial to the transmission input shaft and the output shaft, which is often technically disadvantageous, since, apart from gearshift elements, hydraulic systems as well as an oil pan for the gearbox are mounted below the gearset arranged on the main shaft and countershaft. In such cases, a certain amount of unused free installation space remains above the gearset.

An example for a gear transmission mechanism is illustrated and described in DE 197 94 980 A1. In this transmission mechanism, the countershaft with the torque-proof counter gears arranged on it is located exactly below a main shaft with respect to the axle system of the vehicle so that most of the overall installed size of this transmission is located below the input shaft and output shaft respectively co-axial to the main shaft and little space is left for hydraulic systems and gearshift elements for the transmission.

DE 37 17 255 C2 shows a similar transmission, where the countershaft is also arranged below a main shaft. There is also an oil pan below the countershaft so that the primary overall installed size of the transmission extends far below the main shaft co-axial to the input and output shaft, respectively, and can therefore limit the ground clearance of the vehicle.

A construction design with a countershaft arranged below the main shaft can cause installation problems, particularly for double clutch transmissions since, owing to the complex activation of such a transmission, voluminous gearshift and hydraulic elements are positioned below the main shaft axis predetermined by the input and output shaft. In this case, a significant amount of excess installation space is left unused above the transmission, which is disadvantageous in modern motor vehicles because of the high packing density in the engine compartment.

An example of a gear transmission developed as a double clutch transmission, is shown in the document "Christiani—competent in the field of motor vehicles" at www.kfz-tech.de, under the caption "transmission with double clutch", where the illustration clearly shows that because of the countershaft located at the bottom, the overall installed size is significantly displaced downward.

Against this background, the object of the invention is to create a gear transmission mechanism, where the clearance in the engine compartment of a motor vehicle can generally be used more efficiently while, at the same time, not exceeding the lower limit of the installation space.

SUMMARY OF THE INVENTION

The invention is based on the knowledge that the countershaft of a gear transmission mechanism can be moved arbitrarily in a circle around the axis of the main shaft such that installation space, occupied by the transmission, may be varied within certain limits without impairing the functionality of the gearbox.

The invention is thus based on a gear transmission mechanism for motor vehicles comprising a main shaft and a countershaft parallel to one another on which different gear wheels for different gear ratios are arranged. The solution of the task is that the countershaft is arranged above a horizontal plane (X-Y axis) containing the main shaft axis with respect to the axle system of the vehicle.

This arrangement allows the gearset in the transmission housing formed by the idler gears and the rotationally fixed counter gears to be displaced upwardly and additional installation space to be created below this gearset, where the hydraulic system, gearshift elements or other necessary parts, such as an oil pan, can be arranged below the gearbox without the need to displace it entirely upwards just because the clearance is available. The main shaft would no longer be aligned with the respective input and output shafts.

In a preferred embodiment, the invention provides that the countershaft is basically arranged perpendicular above the main shaft. Thus, above the main shaft, the installation space becomes available and the transmission mechanism does not extend in the direction of the gear width (in Y-axis direction).

In a further preferred embodiment of the invention, the functional components of the gear transmission mechanism, such as gearshift elements, hydraulic aggregates, oil pans, etc., are provided in a space along the horizontal plane below the main shaft axis, as already described earlier.

A particularly compact embodiment of the invention that uses the displacement of the countershaft, according to the invention, to a space above the main shaft provides that the gear transmission mechanism is developed as a double clutch transmission with two partial clutches, co-axial to one another. Both main shafts can respectively be coupled via torque-proof gears arranged on them with idler gears arranged on the countershaft and/or via shiftable idler gears with solid gears arranged on the countershaft.

BRIEF DESCRIPTION OF THE DRAWINGS

The invention will now be described, by way of example, with reference to the accompanying drawings in which.

DETAILED DESCRIPTION OF THE INVENTION

Figure 1:
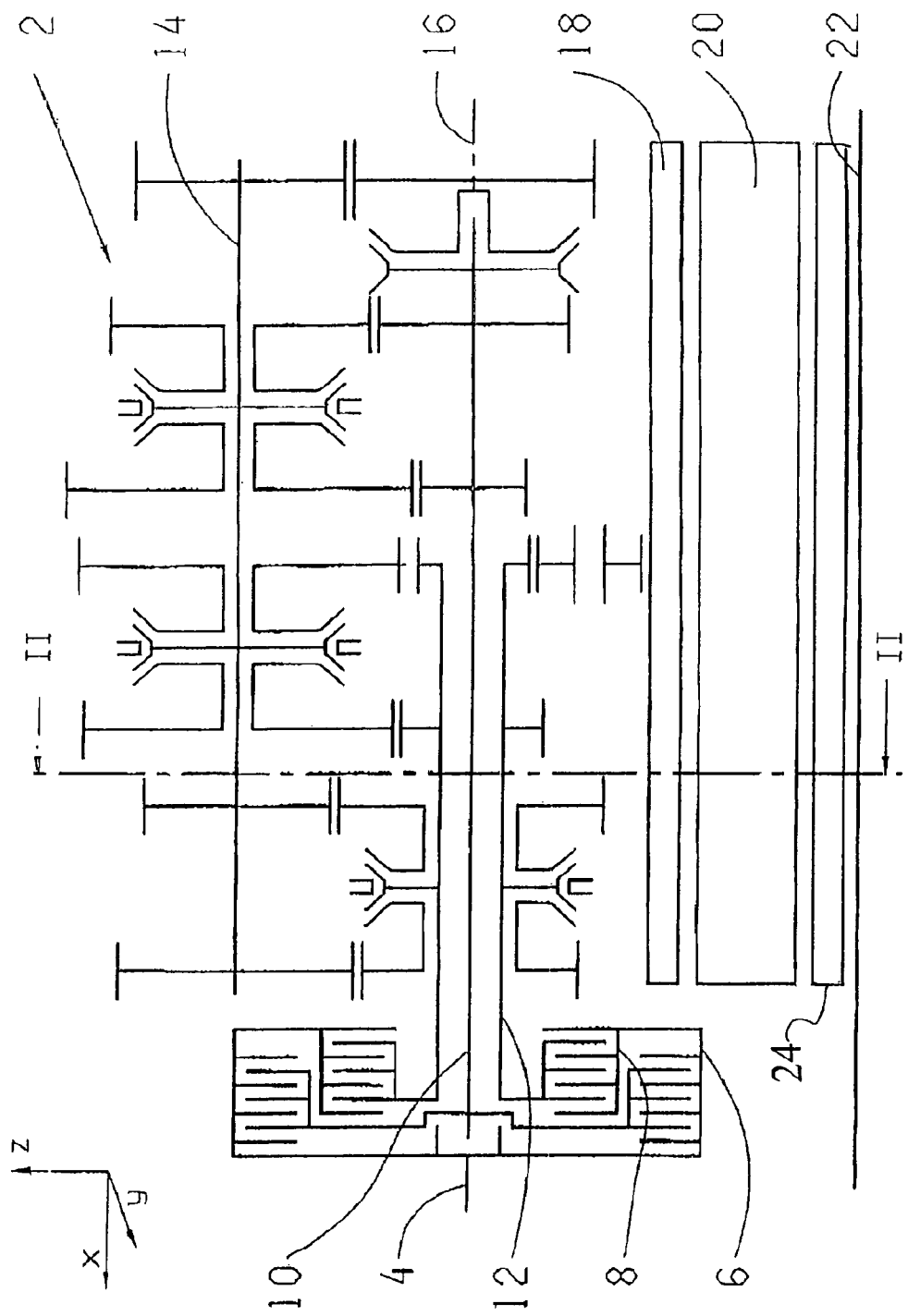
FIG. 1 shows a schematic lateral view of a gear transmission mechanism.

A gear transmission mechanism 2, shown in FIG. 1, is developed as a double clutch transmission. An input shaft 4 is connected to the drive with two partial clutches 6 and 8 co-axial to one another. The first partial clutch 6 is connected to an internal main shaft 10 on the drive side, while the second partial clutch 8 is connected to an external main shaft 12, which is co-axial to the main shaft 10 on the drive side. Idler gears and torque-proof gears are arranged on the internal main shaft 10 and the external main shaft 12, which mesh permanently with torque-proof gears or idler gears arranged on countershaft 14. The idler gears are connected to the corresponding shafts, via assigned clutches, so that the torque can be transmitted. An arrangement of this type is generally known and will therefore not be described in detail.

As can be seen in FIG. 1, the countershaft 14 is arranged above a horizontal plane (X-Y axis) containing a main shaft axis 16 with respect to a three-dimensional axis system of the vehicle. This results in an installation space immediately below the gearset comprising the gears of the main shafts 10, 12 and the countershaft 14 that can be used for gearshift elements 18, a hydraulic system 20 and, if necessary, an oil pan 24 for the gear transmission mechanism 2, without falling short of a z=0 line 22, which is predetermined by the ground clearance.

Figure 2:
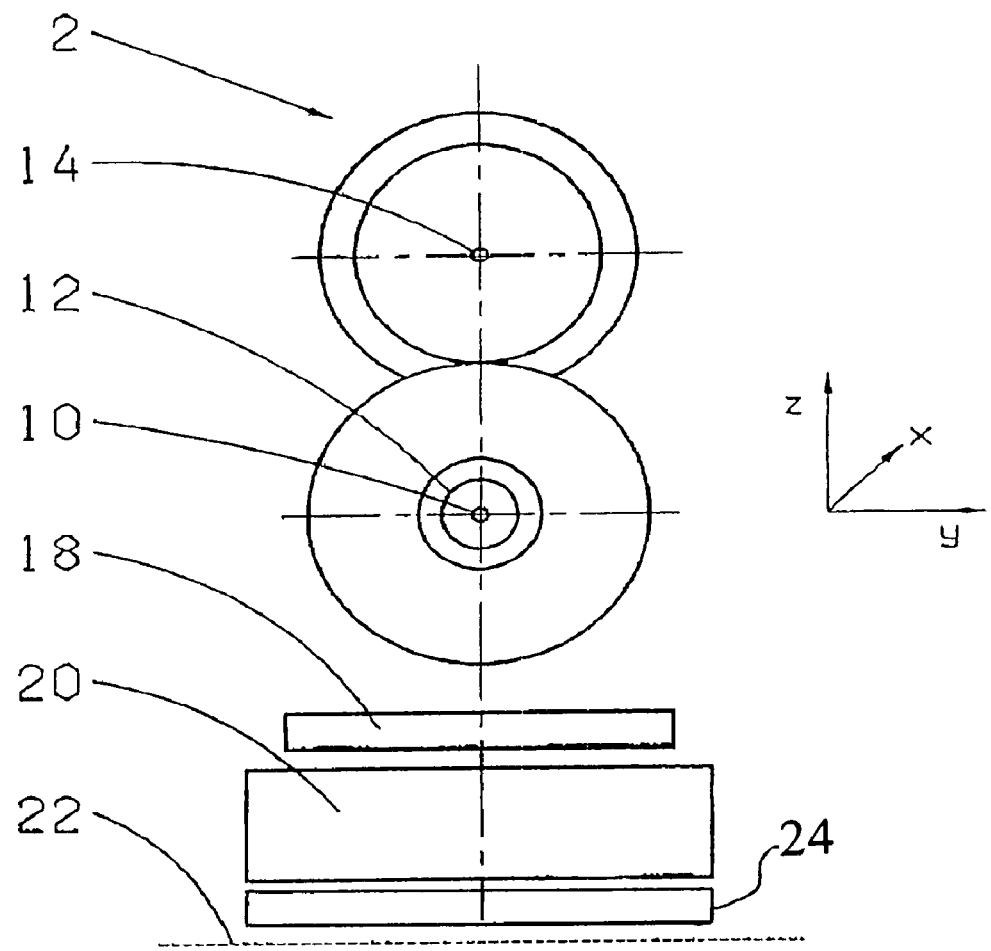
FIG. 2 shows a schematic view of the gear transmission mechanism of FIG. 1 along the line II-II according to FIG. 1.

FIG. 2 shows a schematic view along the line II-II in FIG. 1. It shows that the countershaft 14 is arranged perpendicular above the co-axial main shafts 10, 12 with respect to the axle system of the vehicle. An installation space for the gearshift elements 18, the hydraulic system 20, etc., is available below the gearset.

REFERENCE NUMERALS

2 gear transmission mechanism
4 input shaft
6 partial clutch
8 partial clutch
10 internal main shaft
12 external main shaft
14 countershaft
16 main shaft axis
18 gearshift elements
20 hydraulic system
22 z=0 line
24 oil pan

The invention claimed is:

1. A gear transmission mechanism for a motor vehicle consisting of only one countershaft, the mechanism comprising:
   a main shaft having at least one gear and defining a rotational axis (16);
   the countershaft having at least one gear, and the countershaft extending substantially parallel to the rotational axis of the main shaft;
   the at least one gear of the main shaft communicating with the at least one gear of the countershaft to provide at least one gear ratio,
   the rotational axis (16) of the main shaft (X axis) intersecting a drive axis (Y axis) to define a substantially horizontal plane (X-Y axis), and the countershaft (14) being located along a vertical axis (Z) above the substantially horizontal plane (X-Y axis), when viewed along the substantially horizontal plane (X-Y axis), and
   a hydraulic system of the gear transmission mechanism being located in a space vertically below the substantially horizontal plane (X-Y axis), wherein the main shaft is vertically located between the countershaft and the hydraulic system, the horizontal plane (X-Y) being normal to the vertical axis (Z).

2. The gear transmission mechanism according to claim 1, wherein the countershaft (14) is located substantially vertically above the main shaft (10, 12) when viewed both along the substantially horizontal plane (X-Y axis) and the rotational axis of the main shaft.

3. The gear transmission mechanism according to claim 1, wherein at least one gear shift element is located vertically below the substantially horizontal plane (X-Y axis) when viewed along the substantially horizontal plane (X-Y axis).

4. The gear transmission mechanism according to claim 1, wherein a second main shaft is co-axially arranged with the first main shaft, the gear transmission mechanism (2) is a double clutch transmission which has first and second partial clutches (6, 8) which are co-axial with one another, engagement of the first partial clutch (6) couples an input shaft (4) to the first main shaft (10) while engagement of the second partial clutch (8) couples the input shaft (4) to the second main shaft (12), the first and the second main shafts (10, 12) are coaxial with one another, and the first main shaft and the second main shafts (10, 12) are coupled, via at least one rotationally fixed gear, with at least one idler gear and, via shiftable idler gears, with rotationally fixed gears located on the countershaft (14).

5. A gear transmission mechanism for a motor vehicle consisting of only one countershaft, the mechanism comprising:
   a main shaft having at least one gear and defining a rotational axis (16);
   the countershaft having at least one gear, and the countershaft extending substantially parallel to the rotational axis of the main shaft;
   the at least one gear of the main shaft communicating with the at least one gear of the countershaft to provide at least one gear ratio;
   the rotational axis (16) of the main shaft (X axis) intersecting a drive axis (Y axis) to define a substantially horizontal plane (X-Y axis), and the countershaft (14) being located above the substantially horizontal plane (X-Y axis), when viewed along the horizontal plane (X-Y axis), the horizontal plane being normal to a vertical axis (Z), and
   both gearshift elements (18) for shifting the gears of the gear transmission mechanism and a hydraulic system (20) of the gear transmission mechanism being located in a space along the vertical axis (Z) vertically below the horizontal plane (X-Y axis), wherein the main shaft is vertically located between the countershaft and a grouping of both of the gearshift elements (18) and the hydraulic system (20), and the main shaft and the countershaft are aligned along the vertical axis (Z).

6. The gear transmission mechanism according to claim 5, wherein, relative to the horizontal plane (X-Y), the countershaft (14) is located substantially vertically above the main shaft (10, 12).

7. The gear transmission mechanism according to claim 6, wherein, relative to the horizontal plane (X-Y), an oil pan of the gear transmission mechanism is located vertically below the main shaft (10, 12).

8. The gear transmission mechanism according to claim 7, wherein a second main shaft is co-axially arranged with the first main shaft, the gear transmission mechanism (2) is a double clutch transmission which has first and second partial clutches (6, 8) which are co-axial with one another, engagement of the first partial clutch (6) couples an input shaft (4) to the first main shaft (10) while engagement of the second partial clutch (8) couples the input shaft (4) to the second main shaft (12), the first and the second main shafts (10, 12) are coaxial with one another, and the first main shaft and the second main shafts (10, 12) are coupled, via at least one rotationally fixed gear, with at least one idler gear and, via shiftable idler gears, with rotationally fixed gears located on the countershaft (14).

9. A gear transmission mechanism for a motor vehicle consisting of only one countershaft, the mechanism comprising:
    a main shaft having at least one gear and defining a rotational axis (16);
    the countershaft having at least one gear, and the countershaft extending substantially parallel to the rotational axis of the main shaft;
    the at least one gear of the main shaft communicating with the at least one gear of the countershaft to provide at least one gear ratio,
    the rotational axis (16) of the main shaft (X axis) intersecting a drive axis (Y axis) to define a substantially horizontal plane (X-Y axis), and the countershaft (14) being located above the horizontal plane (X-Y axis), when viewed along the horizontal plane (X-Y axis), the horizontal plane (X-Y) being normal to a vertical axis (Z), and gearshift elements (18), for shifting the gears of the gear transmission mechanism, a hydraulic system (20) of the gear transmission mechanism and an oil pan are all located along the vertical axis (Z) in a space vertically below the horizontal plane (X-Y axis) wherein the main shaft is vertically located between the countershaft and a grouping of the gearshift elements (18), the hydraulic system (20) and the oil pan (24), and the main shaft and the countershaft are aligned with each other along the vertical axis (Z).

10. The gear transmission mechanism according to claim 9, wherein, relative to the horizontal plane (X-Y), the countershaft (14) is located substantially vertically above the main shaft (10, 12).

11. The gear transmission mechanism according to claim 10, wherein the countershaft, the main shaft, the gearshift elements (18), the hydraulic system (20) and the oil pan are all substantially vertically aligned with one another.

12. The gear transmission mechanism according to claim 11, wherein a second main shaft is co-axially arranged with the first main shaft, the gear transmission mechanism (2) is a double clutch transmission which has first and second partial clutches (6, 8) which are co-axial with one another, engagement of the first partial clutch (6) couples an input shaft (4) to the first main shaft (10) while engagement of the second partial clutch (8) couples the input shaft (4) to the second main shaft (12), the first and the second main shafts (10, 12) are coaxial with one another, and the first main shaft and the second main shafts (10, 12) are coupled, via at least one rotationally fixed gear, with at least one of idler gear and, via shiftable idler gears, with rotationally fixed gears located on the countershaft (14).

* * * * *